(12) United States Patent
Akashi et al.

(10) Patent No.: US 6,170,774 B1
(45) Date of Patent: Jan. 9, 2001

(54) DEVICE FOR DRIVING REEL SUPPORTS (75) Inventors: Yoshiharu Akashi, Daito; Takahiro Okuie, Nara, both of (JP)

(73) Assignee: Sanyo Electric Co., Ltd., Osaka (JP)

( * ) Notice: Under 35 U.S.C. 154(b), the term of this patent shall be extended for 0 days.

(21) Appl. No.: 09/276,516

(22) Filed: Mar. 25, 1999

(30) Foreign Application Priority Data

Mar. 26, 1998 (JP) ................................................ 10-079465

(51) Int. Cl.⁷ ............................ G11B 15/32; G11B 15/44
(52) U.S. Cl. ...................................... 242/356.6; 360/96.4
(58) Field of Search ........................... 242/356.3, 356.5, 242/356.6; 360/96.3

(56) References Cited

U.S. PATENT DOCUMENTS

| | | | | |
|---|---|---|---|---|
| 5,230,483 | * | 7/1993 | Kang | 242/356.5 |
| 5,478,023 | * | 12/1995 | Tomita | 242/356.6 |
| 5,573,197 | * | 11/1996 | Choi | 242/356.6 |
| 5,641,130 | * | 6/1997 | Weisser | 242/356.5 |
| 5,884,858 | * | 3/1999 | Woo | 242/356.5 |

FOREIGN PATENT DOCUMENTS

| | | |
|---|---|---|
| 63-59085 | 3/1988 | (JP) . |
| 61-127086 | 11/1989 | (JP) . |

\* cited by examiner

Primary Examiner—Katherine A. Matecki
(74) Attorney, Agent, or Firm—Armstrong, Westerman, Hattori, McLeland & Naughton (57) ABSTRACT The invention provides a reel support drive mechanism which has a frictional power transmission mechanism 2 disposed in a power transmission path extending from a motor toward two reel supports 7, 71. The transmission mechanism 2 comprises a felt plate 23 interposed between a pulley 21 and PLAY and REV disks 32, 26 which are rotatable relative to and coaxially with the pulley. The PLAY disk 32 is slidable in contact with an outer peripheral region of the felt plate 23, and the REV disk 26 is slidable in contact with an inner peripheral region of the felt plate 23. A one-way clutch spring 27 is provided between the PLAY disk 32 and the REV disk 26. Power is output from the PLAY disk 32.

4 Claims, 8 Drawing Sheets

DEVICE FOR DRIVING REEL SUPPORTS

FIELD OF THE INVENTION

The present invention relates to a reel support drive device for use in magnetic recording-reproduction apparatus, such as VCRs (video cassette recorders) and DATs (digital audio tape recorders), for drivingly rotating a supply reel support and a take-up reel support by a motor.

BACKGROUND OF THE INVENTION

Figure 8:
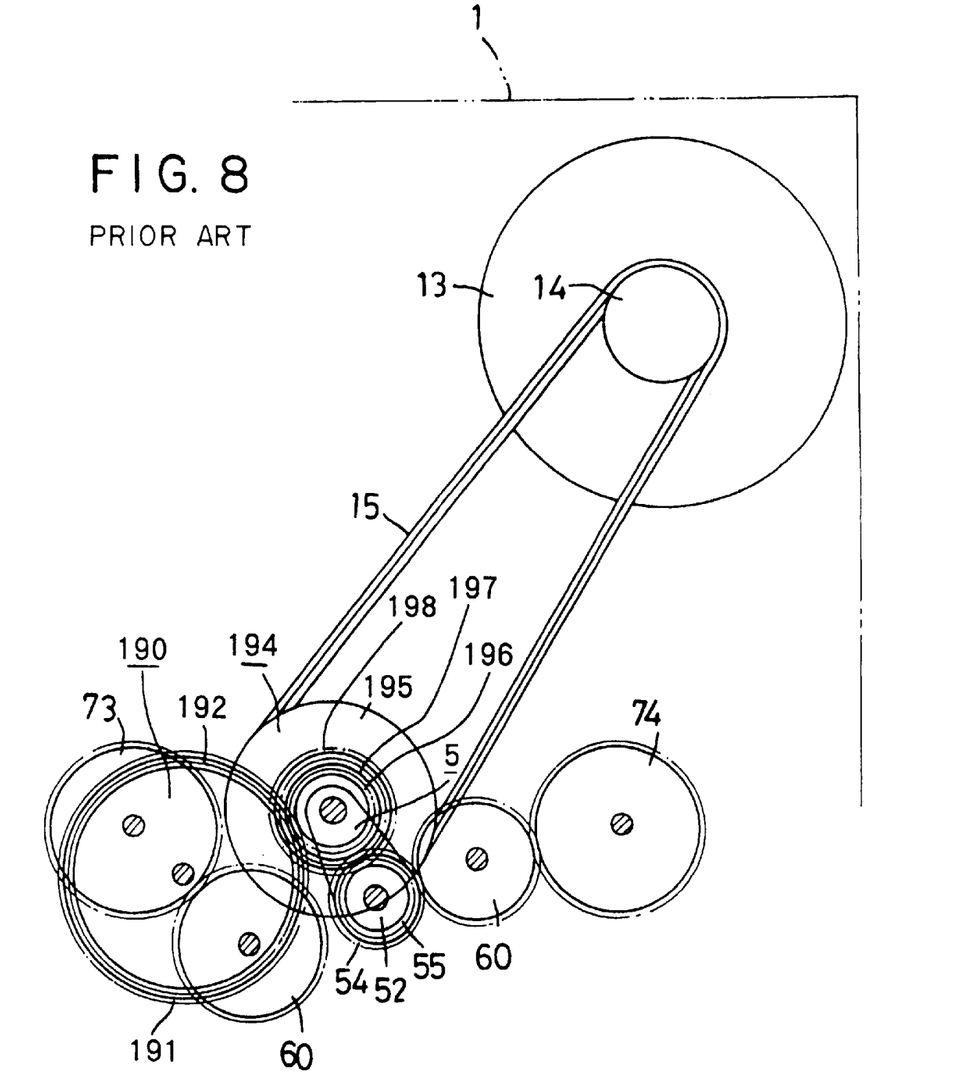
FIG. 8 is a plan view showing power transmission paths in a conventional reel support drive device.

With reference to FIG. 8, the rotation of a capstan motor 13 is conventionally transmitted to a reel gear 73 of a supply reel support or to a reel gear 74 of a take-up reel support by way of a clutch rotation mechanism 194, frictional power transmission mechanism 190, swing idler mechanism 5 and one of a plurality of intermediate gears 60.

A drive pulley 14 is mounted on the output shaft of the capstan motor 13 and coupled to a driven pulley 195 of the clutch rotation mechanism 194 by a belt 15. A first gear 196 fixed to the driven pulley 195 is in mesh with a first gear 191 of the frictional power transmission mechanism 190. A felt plate (not shown) is interposed between the first gear 191 of the transmission mechanism 190 and a second gear 192 thereof. The second gear 192 of the transmission mechanism 190 is in mesh with a second gear 197 of the clutch rotation mechanism 194. A third gear 198 fixed to the second gear 197 is in mesh with a small gear 55 of an idler 52 providing the swing idler mechanism 5. A large gear 54 is fixed to the small gear 55. The large gear 54 is caused to selectively mesh with one of the intermediate gears 60 by the swing motion of the idler 52.

In this way, the rotation of the capstan motor 13 is transmitted to one of the reel gears 73, 74 selectively, drivingly rotating the supply reel support or take-up reel support in a tape winding direction.

The VCR can be set in a forward reproduction mode (hereinafter referred to as the "PLAY mode") wherein the take-up reel support (reel gear 74) is drivingly rotated in the tape winding direction (clockwise direction) to play back a magnetic tape as loaded in position, i.e., as wound around a capstan and a rotary head cylinder. The VCR can be set also in a reverse reproduction mode (hereinafter referred to as the "REV mode") wherein the supply reel support (reel gear 73) is drivingly rotated in the tape winding direction (counterclockwise direction) to play back the tape as loaded. The recorder is further settable in a fast forward mode (hereinafter referred to as the "FF mode") wherein the take-up reel support is rotated at a high speed in the tape winding direction, and in a rewind mode (hereinafter referred to as the "REW mode") wherein the supply reel support is rotated at a high speed in the tape winding direction.

In the PLAY mode and the REV mode, the first gear 196 and the second gear 197 of the clutch rotation mechanism 194 are out of engagement and rotatable relative to each other, permitting the rotation of the capstan motor 13 to be transmitted to the swing idler mechanism 5 through the frictional transmission mechanism 190. In the FF mode and the REW mode, on the other hand, the first gear 196 and the second gear 197 of the clutch rotation mechanism 194 are rotatable together in engagement to transmit the rotation of the capstan motor 13 from the mechanism 194 directly to the idler mechanism 5.

In the VCR, the tape running path extending from the supply reel support to the capstan via the rotary head cylinder involves a great load. In the PLAY mode, the capstan gives an additional tape transport force for running the magnetic tape from the supply reel support to the capstan via the head cylinder, whereas the capstan gives no tape transport force in the REV mode for running the magnetic tape from the capstan to the supply reel support via the rotary head cylinder. Accordingly, driving the supply reel support in the REV mode requires greater torque than is needed in the PLAY mode.

With the conventional VCR, therefore, the reel gear 73 of the supply reel support and the reel gear 74 of the take-up reel support are made different in reduction ratio so as to give greater drive torque to the supply reel support in the REV mode than to the take-up reel support in the PLAY mode.

The difference in reduction ratio between the reel gear 73 of the supply reel support and the reel gear 74 of the take-up reel support nevertheless entails the problem that the tape winding speed becomes lower in the REW mode than in the FF mode to impair the sophistication of the recorder operation.

SUMMARY OF THE INVENTION

An object of the present invention is to provide a reel support drive device wherein the reduction ratio of the power transmission path from the motor to the supply reel support is made equal to that of the power transmission path from the motor to the take-up reel support in both the FF mode and the REW mode, and greater drive torque can nevertheless be given to the supply reel support in the REV mode than to the take-up reel support in the PLAY mode.

The present invention provides a reel support drive mechanism which has a frictional power transmission mechanism 2 disposed in a power transmission path extending from a capstan motor 13 toward a supply reel support 7 and a take-up reel support 71, the transmission mechanism 2 comprising a friction member (felt plate 23) interposed between an input rotary body (pulley 21) and an output rotary body (comprising a PLAY disk 32 and a REV disk 26) which are coaxially rotatable relative to each other.

The output rotary body of the power transmission mechanism 2 comprises a first rotary member (PLAY disk 32) slidable in contact with one of an outer peripheral region and an inner peripheral region of the friction member, a second rotary member (REV disk 26) slidable in contact with the other region of the friction member, and one-way clutch means (one-way clutch spring 27) provided between the two rotary members. The first rotary member (PLAY disk 32) outputs power. The one-way clutch means (one-way clutch spring 27) connects the first rotary member (PLAY disk 32) and the second rotary member (REV disk 26) to each other in the REV mode while disconnecting the two rotary members from each other in the PLAY mode.

When the PLAY mode is set, the PLAY disk 32 and the REV disk 26 are disconnected by the one-way clutch spring 27 and made rotatable relative to each other. When the pulley 21 is drivingly rotated in this state, the PLAY disk 32, which is loaded, slips relative to the felt plate 23.

On the other hand, the REV disk 26 is free to rotate relative to the PLAY disk 32 and therefore rotates with the pulley 21 and the felt plate 23 without slipping relative to the felt plate 23. Accordingly, the PLAY disk 32 outputs frictional torque resulting from the slippage between the felt plate 23 and the PLAY disk 32.

When the REV mode is set, the PLAY disk 32 and the REV disk 26 are connected by the one-way clutch spring 27 and therefore rotatable together. When the pulley 21 is drivingly rotated in this state, the PLAY disk 32, which is loaded, slips relative to the felt plate 23. Since the REV disk 26 rotates with the PLAY disk 32, slippage also occurs between the felt plate 23 and the REV disk 26.

The frictional torque resulting from the slippage between the felt plate 23 and the REV disk 26 is therefore added to the frictional torque due to the slippage between the felt plate 23 and the PLAY disk 32, and the combined value of the two frictional torques is delivered from the PLAY disk 32.

In a specific embodiment, a clutch rotary body (clutch gear 4) is provided coaxially with the input rotary body (pulley 21) and the output rotary body (PLAY disk 32 and REV disk 26) of the power transmission mechanism (2). The clutch rotary body is in engagement with the first rotary member (PLAY disk 32) of the output rotary body at all times to rotate therewith and is engageable with or disengageable from the input rotary body (pulley 21) to rotate therewith when engaged therewith. The clutch rotary body (clutch gear 4) is coupled to a control mechanism for engaging the clutch rotary body with the input rotary body (cap disk 37 of the pulley 21) in the FF mode and the REW mode while disengaging the clutch rotary body from the input rotary body in the PLAY mode and the REV mode.

When the FF mode or the REW mode is set, the clutch gear 4 in engagement with the PLAY disk 32 is engaged also with the cap disk 37 of the pulley 21 by the movement of the control mechanism of the embodiment. As a result, the pulley 21 and the clutch gear 4 are connected to each other, and the clutch gear 4 is made rotatable with the pulley 21. Accordingly, the supply reel support 7 or the take-up reel support 71 can be rotated at a high speed by rotating the pulley 21 at a high speed.

With the reel support drive device embodying the invention, different frictional torques are available for the PLAY mode and the REV mode to give greater reel support drive torque in the REV mode than in the PLAY mode, so that the power transmission paths from the motor to the two reel supports can be made equal in reduction ratio. This assures the FF mode and the REW mode of the same tape winding speed.

DETAILED DESCRIPTION OF EMBODIMENT

An embodiment of the invention as applied to a VCR will be described in detail with reference to the drawings.

Figure 2:
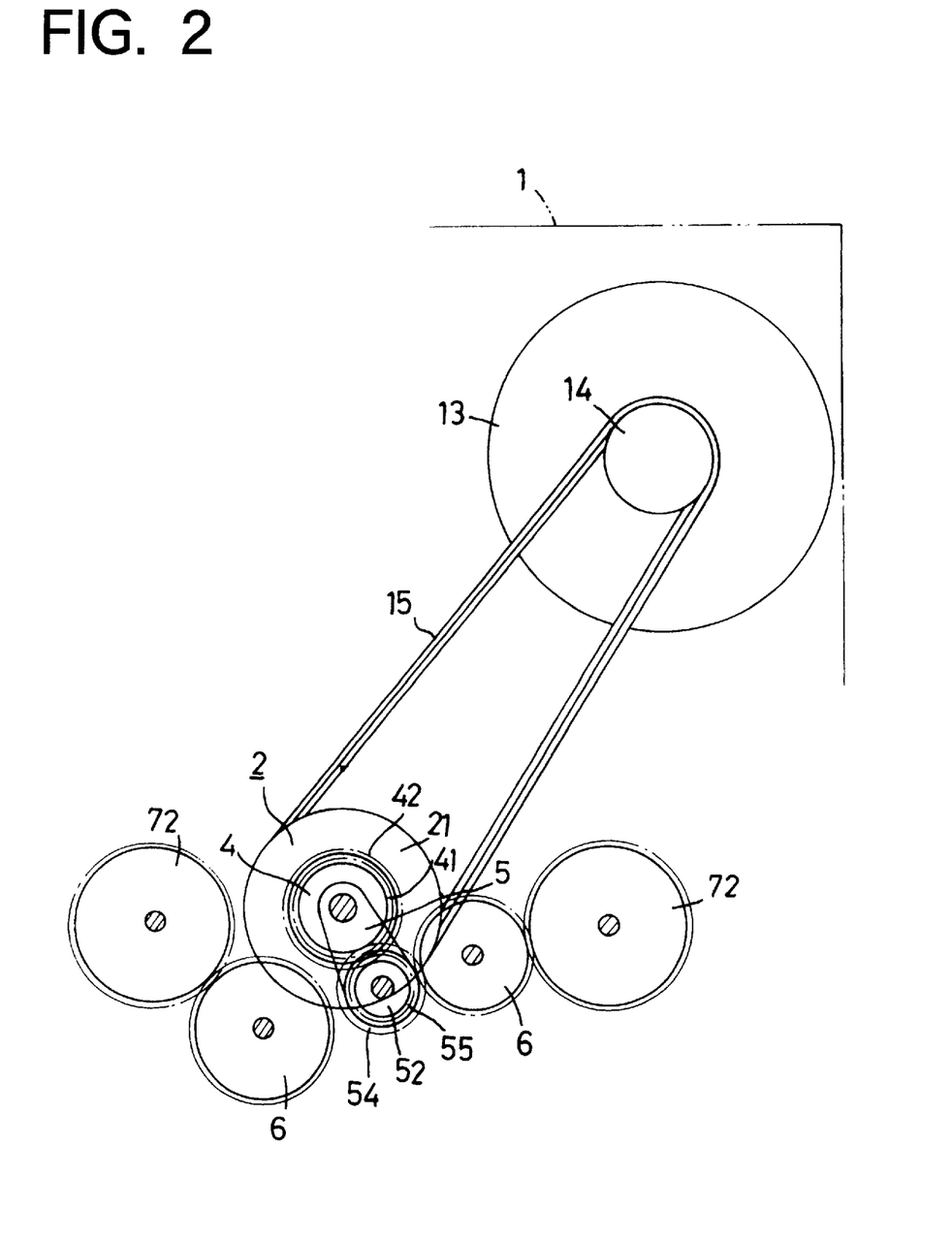
FIG. 2 is a plan view showing power transmission paths in the device.

With reference to FIG. 2, a reel support drive device according to the invention is so adapted that the rotation of a capstan motor 13 is transmitted to a reel gear 72 of one of a supply reel support 7 and a take-up reel support 71 by way of a frictional power transmission mechanism 2, clutch gear 4, swing idler mechanism 5 and one of intermediate gears 6.

A drive pulley 14 mounted on the output shaft of the capstan motor 13 is coupled to a driven pulley 21 of the transmission mechanism 2 by a belt 15. The clutch gear 4, which comprises a small gear 41 and a large gear 42, is in engagement with the transmission mechanism 2 as will be described below, to transmit the rotation from the small gear 41 or large gear 42 to the swing idler mechanism 5. This causes an idler 52 of the idler mechanism 5 to perform a swing motion, meshing a large gear 54 of the idler 52 with one of the intermediate gears 6 and drivingly rotating one of the reel gears 72 in a tape winding direction.

Figure 1:
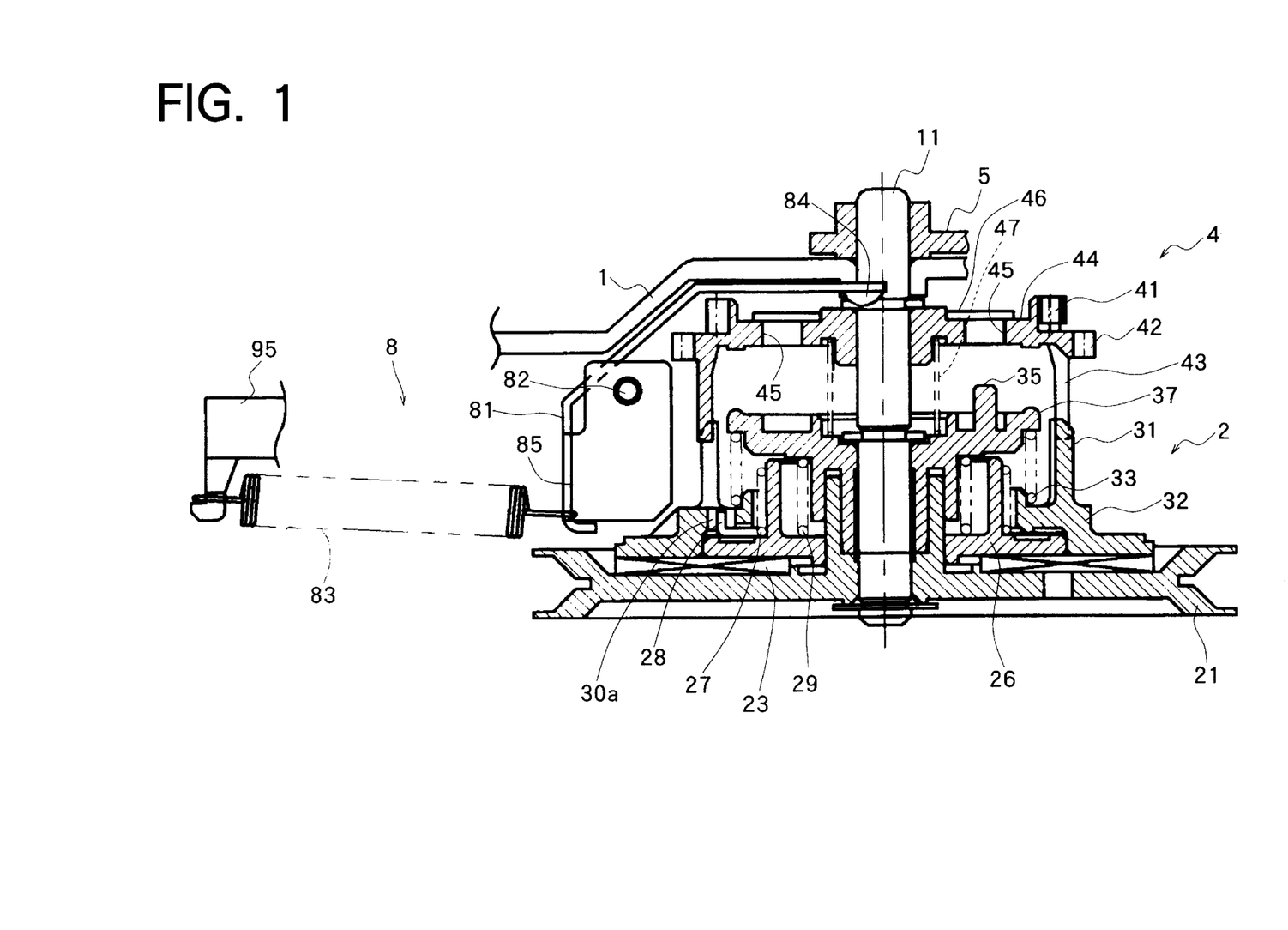
FIG. 1 is a fragmentary view in section showing on an enlarged scale a reel support drive device embodying the invention.

With reference to FIG. 1, a chassis 1 has vertically supported thereon a pivot 11, with the frictional power transmission mechanism 2 rotatably mounted on a lower portion of the pivot 11. The clutch gear 4 is mounted on an upper portion of the pivot 11 rotatably and upwardly or downwardly slidably.

The transmission mechanism 2 comprises the aforementioned driven pulley 21, a circular felt plate 23 immovably affixed to the upper surface of the pulley 21, a REV disk 26 fitted to the driven pulley 21 to be rotatable relative thereto, and a PLAY disk 32 fitted to the REV disk 26 to be rotatable relative thereto. A cap disk 37 is fitted to and rotatable with the driven pulley 21.

The PLAY disk 32 has a lower surface slidable in contact with an outer peripheral region of the felt plate 23, and the REV disk 26 has a lower surface slidable in contact with an inner peripheral region of the felt plate 23. A PLAY spring 33 is provided between the PLAY disk 32 and the cap disk 37 for pressing the PLAY disk 32 against the felt plate 23. A REV spring 29 is provided between the REV disk 26 and the cap disk 37 for pressing the REV disk 26 against the felt plate 23.

A one-way clutch spring 27 is interposed between the PLAY disk 32 and the REV disk 26. The spring 27 has an inner periphery in contact with the outer periphery of the REV disk 26 and is formed at one end thereof with an L-shaped projection 28, which is engaged in a hole 30a formed in the PLAY disk 32. A clutch spring 47 is interposed between the cap disk 37 and the clutch gear 4 for pushing up the gear 4.

Figure 5:
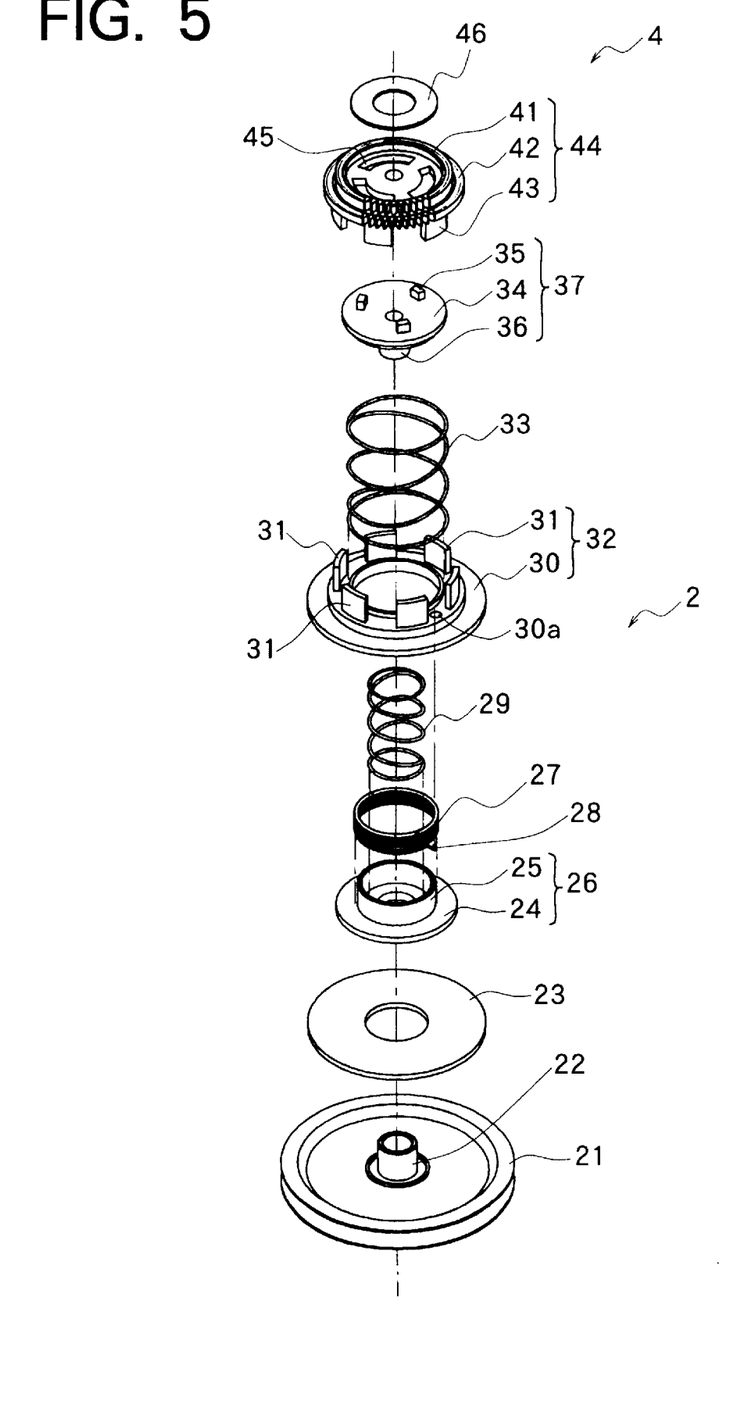
FIG. 5 is an exploded perspective view of a frictional power transmission mechanism and a clutch gear.

With reference to FIG. 5, the driven pulley 21 has a sleeve portion 22 projecting upward therefrom, while a sleeve portion 36 extends downward from the cap disk 37. The two sleeve portions 22, 36 fit to each other. The REV disk 26 comprises a disk portion 24 and a sleeve portion 25. The clutch spring 27 is fitted around the sleeve portion 25.

The PLAY disk 32 comprises a disk portion 30 and a plurality of claws 31 formed on the upper surface of the disk portion 30. The hole 30a is formed in the disk portion 30. The cap disk 37 comprises a disk portion 34 and a plurality of projections 35 formed on the upper surface of the disk portion 34. The disk portion 34 is formed with the sleeve portion 36.

The clutch gear 4 comprises a gear body 44 and a disk 46 placed on the gear body 44. The gear body 44 has the small gear 41 and the large gear 42. A plurality of claws 43 meshable with the claws 31 of the PLAY disk 32 project downward from the lower surface of the large gear 42. The gear body 44 is formed with circular-arc slits 45 for the projections 35 of the cap disk 37 to fit in.

Figure 3:
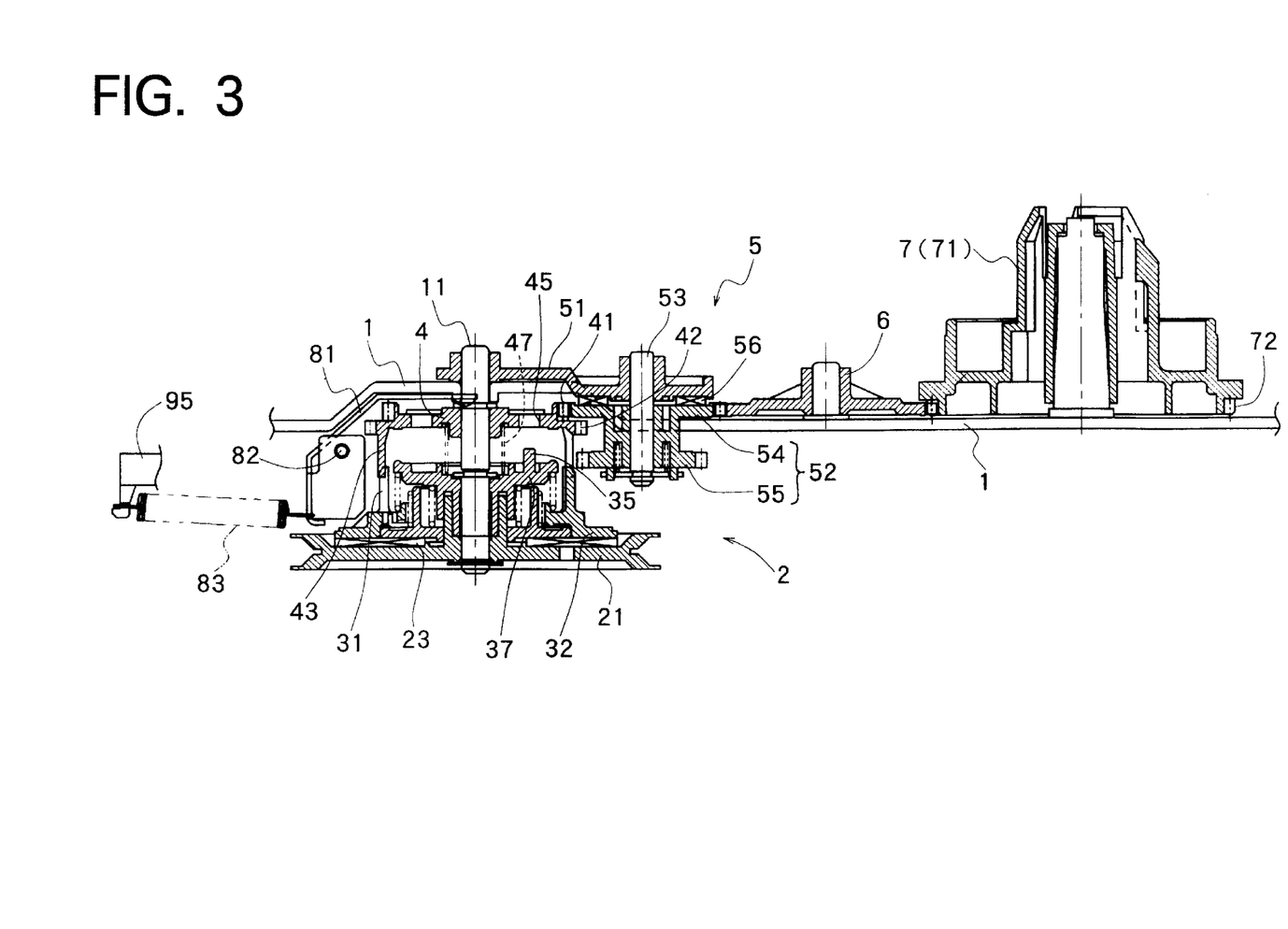
FIG. 3 is a view in section of the reel support drive device in a PLAY mode and a REV mode.
Figure 4:
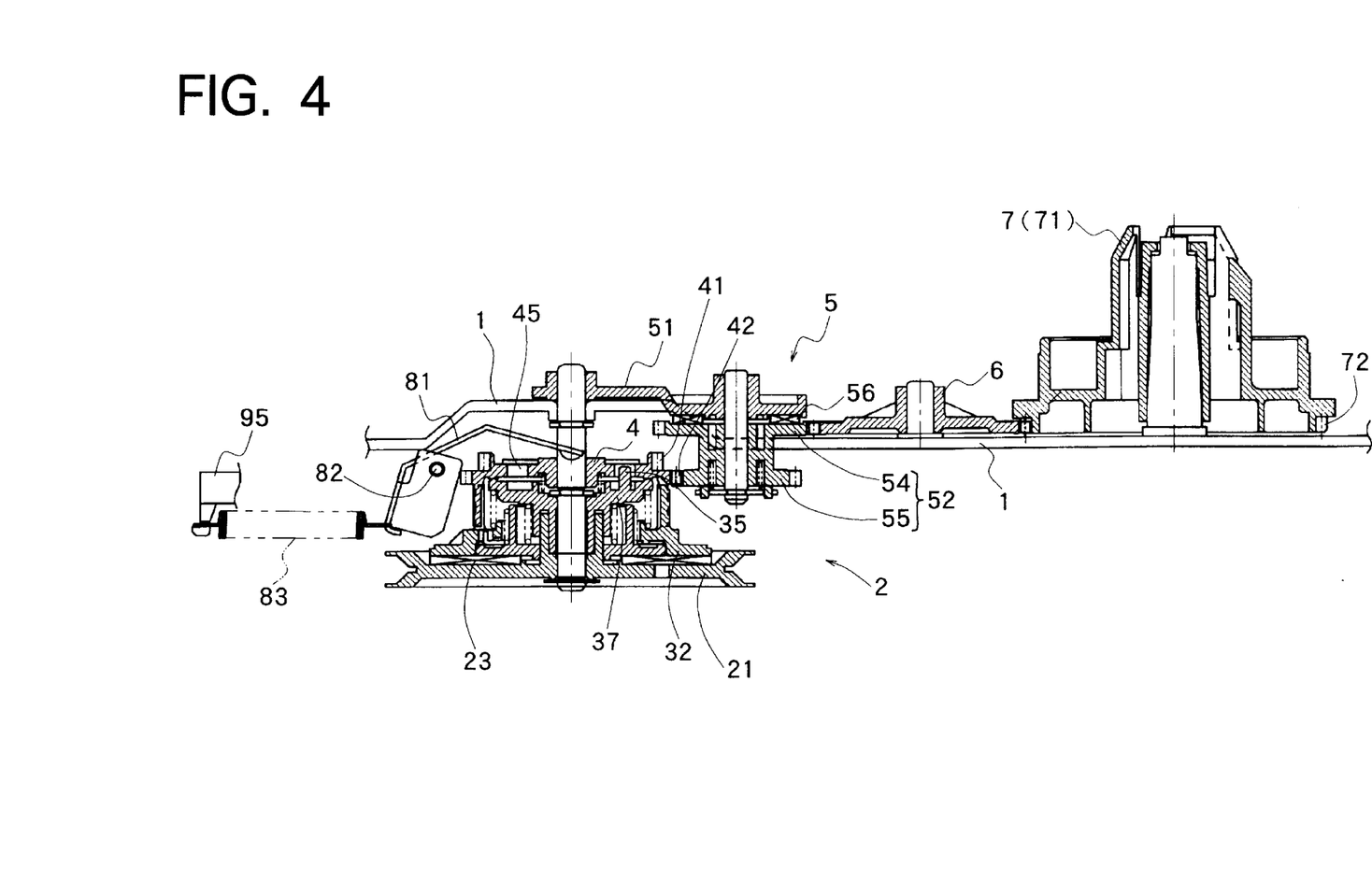
FIG. 4 is a view in section of the reel support drive device in an FF mode and a REW mode.

The clutch gear 4 is reciprocatingly movable between a raised position shown in FIG. 3 and a lowered position shown in FIG. 4. The claws 43 of the clutch gear 4 remain meshing with the claws 31 of the PLAY disk 32 even when the gear 4 moves reciprocatingly. With the clutch gear 4 in its raised position as seen in FIG. 3, the slits 45 of the clutch gear 4 are away from the projections 35 of the cap disk 37, permitting the rotation of the gear 4 and the driven pulley 21 relative to each other, whereas when the clutch gear 4 moves to its lowered position shown in FIG. 4, the projections 35 of the cap disk 37 fit into the respective slits 45 of the clutch gear 4, whereby the clutch gear 4 is connected to the driven pulley 21.

Figure 6:
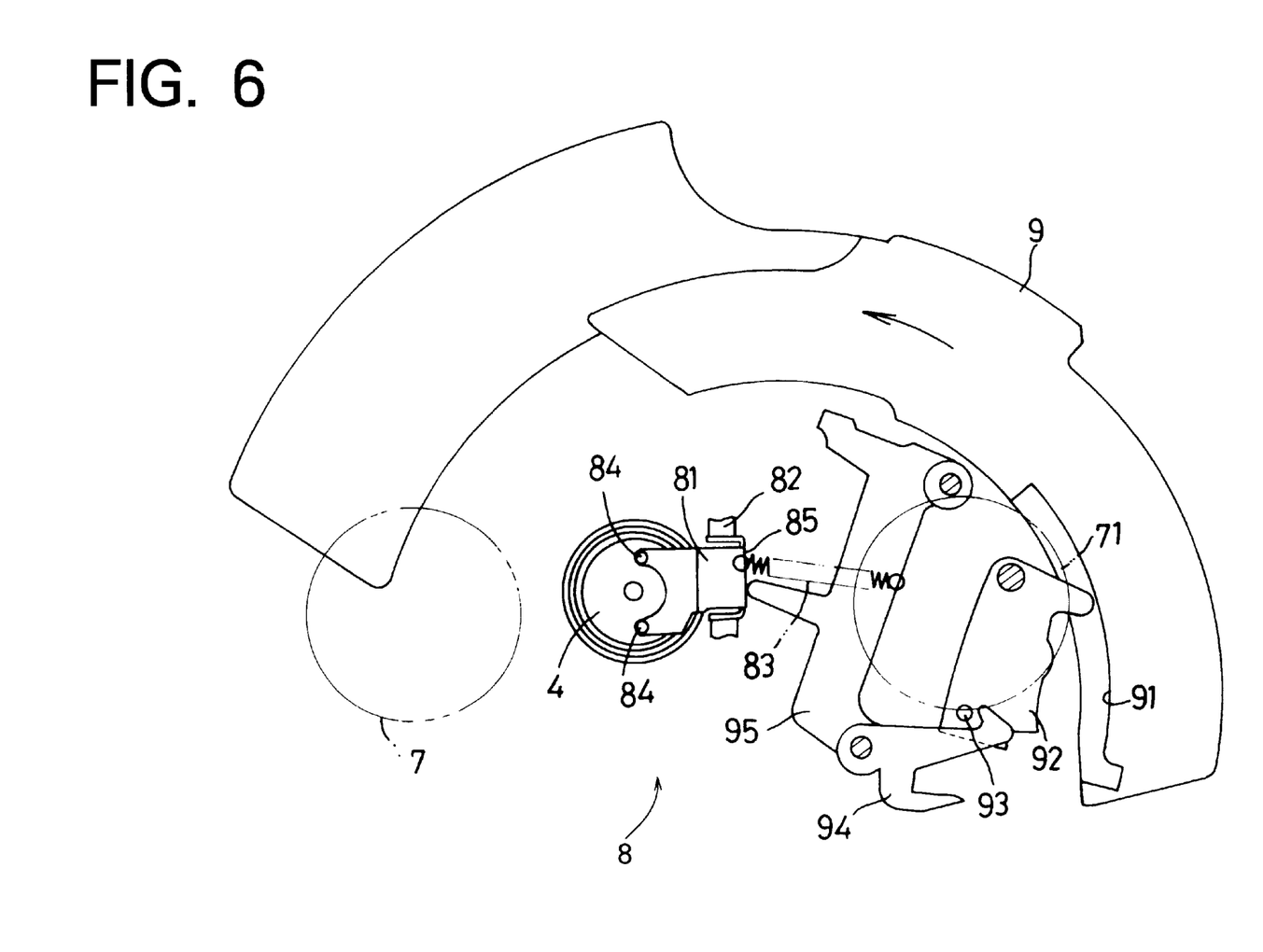
FIG. 6 is a plan view showing a drive system for a raising-lowering mechanism in the PLAY mode and the REV mode.
Figure 7:
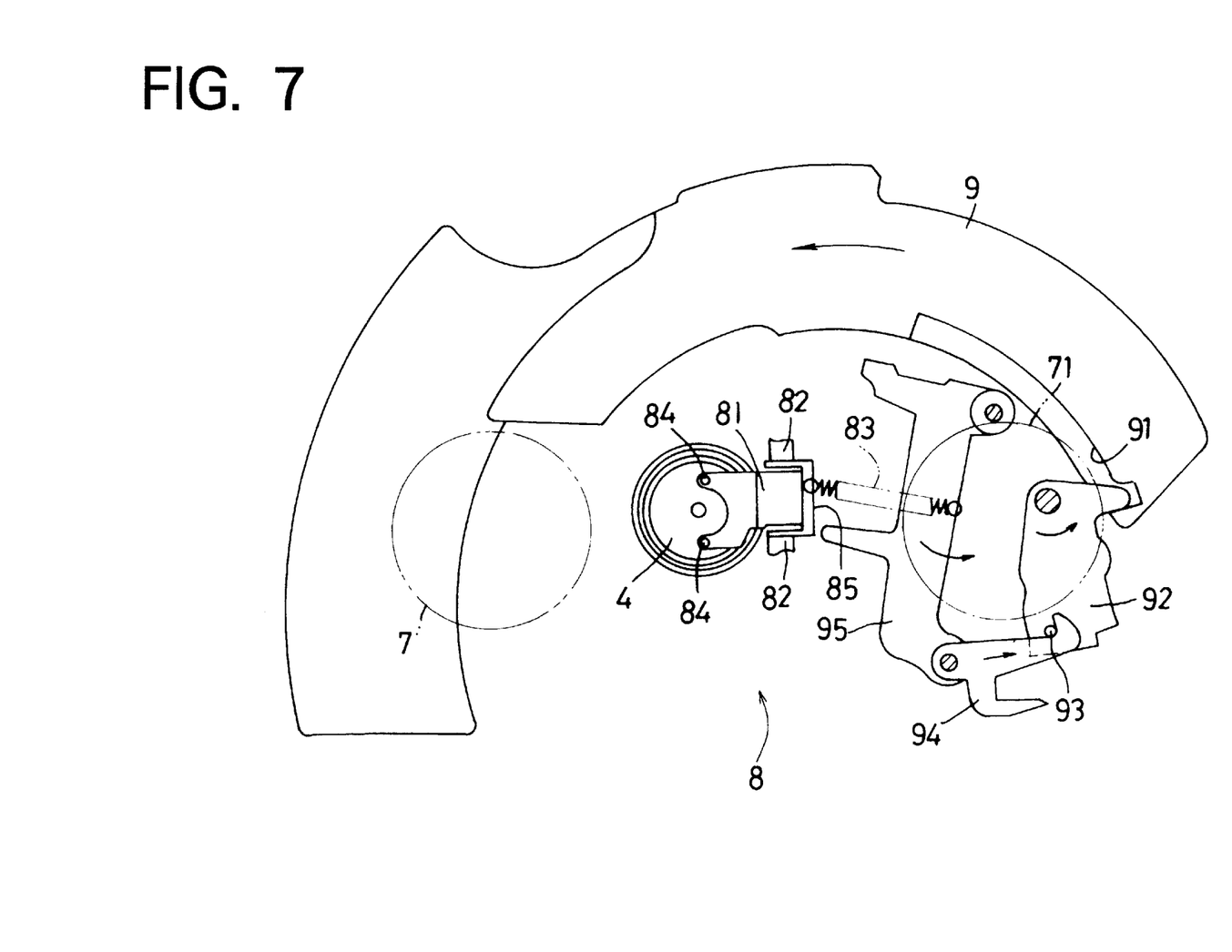
FIG. 7 is a plan view of the same in the FF mode and the REW mode.

A control mechanism shown in FIGS. 6 and 7 is coupled to the clutch gear 4. The control mechanism comprises a control slide plate 9 for controlling tape loading and braking operations of the VCR and is adapted to transmit the movement of the slide plate 9 to the clutch gear 4 by way of a first lever 92, second lever 94 and raising-lowering mechanism 8. The slide plate 9 is driven by a mechanism, which is well known (see, for example, JP-A No. 21624/1995) and will therefore not shown or described.

With reference to FIG. 1, the raising-lowering mechanism 8 comprises a pivotal lever 81 supported by a pin 82 on the chassis 1 and pivotally movable in a vertical plane. The pivotal lever 81 has one end extending to above the disk 46 of the clutch gear 4 and having a protuberance 84 slidable in contact with the disk 46. A third lever 95 is connected by a spring 83 to the other end 85 of the pivotal lever 81. FIG. 6 shows the mechanism 8 with the clutch gear 4 held in its raised position. When the control slide plate 9 is driven in the direction of an arrow from this state, the first lever 92 is turned counterclockwise by a cam groove 91 in the slide plate 9, causing a pin 93 on the first lever 92 to pull the second lever 94 toward the direction of an arrow as shown in FIG. 7. The third lever 95 connected to the second lever 94 is turned counterclockwise by this movement to pull the spring 83.

Consequently, the pivotal lever 81 turns clockwise, pushing down the clutch gear 4 against the clutch spring 47 as seen in FIG. 4. Further the return of the control slide plate 9 from the position of FIG. 7 to the position of FIG. 6 turns the pivotal lever 81 counterclockwise, thereby permitting the clutch spring 47 to push up the clutch gear 4 as shown in FIG. 3.

Referring to FIGS. 3 and 4, the swing idler mechanism 5 comprises an arm 51 supported by the upper end of the pivot 11, the above-mentioned idler 52 rotatably fitted around a shaft 53 provided upright at a free end of the arm 51, and a felt plate 56 interposed between the arm 51 and the idler 52. The idler 52 comprises the large gear 54 meshable with the small gear 41 of the clutch gear 4 and a small gear 55 coaxial with the gear 54 and meshable with the large gear 42 of the clutch gear 4.

With the clutch gear 4 in its raised position as shown in FIG. 3, the small gear 41 of the clutch gear 4 is in mesh with the large gear 54 of the idler 52. When the clutch gear 4 is in its lowered position as seen in FIG. 4, the large gear 42 of the clutch gear 4 is in mesh with the small gear 55 of the idler 52. The swinging motion of the arm 51 brings the large gear 54 of the idler 52 into meshing engagement with one of the intermediate gears 6 as previously stated.

When the VCR described is set in the PLAY mode, the driven pulley 21 is drivingly rotated counterclockwise with the clutch gear 4 held in its raised position as shown in FIG. 3. At this time, the PLAY disk 32 is under a load, so that slippage occurs between the felt plate 23 and the PLAY disk 32.

With the counterclockwise rotation of the felt plate 23, the REV disk 26 rotates counterclockwise, whereas the PLAY disk 32, which slips relative to the plate 23, rotates clockwise relative to the REV disk 26 at a lower speed than the REV disk 26. As a result, the one-way clutch spring 27 held to the PLAY disk 26 so deforms as to increase in inside diameter, releasing the outer periphery of the REV disk 26 from pressing contact with the spring to disconnect the disk 26 from the PLAY disk 32. This permits the REV disk 26 to rotate with the driven pulley 21, with no slippage occurring between the REV disk 26 and the felt plate 23.

Accordingly, frictional torque resulting from the slippage between the felt plate 23 and the PLAY disk 32 is transmitted from the PLAY disk 32 to the swing idler mechanism 5 via the clutch gear 4. The large gear 54 of the idler 52 meshes with the intermediate gear 6 adjacent the take-up reel support 71 as shown in FIG. 3, drivingly rotating the take-up reel support 71 clockwise.

When the VCR is set in the REV mode, the driven pulley 21 is drivingly rotated clockwise. Since the PLAY disk 32 is loaded at this time, slippage occurs between the felt plate 23 and the PLAY disk 32. Further with the clockwise rotation of the PLAY disk 32, a rotational force acts on the projection 28 of the one-way clutch spring 27, which in turn so deforms as to decrease in inside diameter. Consequently, the inner periphery of the clutch spring 27 comes into pressing contact with the outer periphery of the REV disk 26 to couple the disk 26 to the PLAY disk 32, whereby the REV disk 26 is rotated with the PLAY disk 32 clockwise, with slippage occurring also between the REV disk 26 and the felt plate 23.

Accordingly, the frictional torque resulting from the slippage between the felt plate 23 and the REV disk 26 is added to the frictional torque due to the slippage between the felt plate 23 and the PLAY disk 32, and the combined value of the two frictional torques is transmitted from the PLAY disk 32 to the swing idler mechanism 5 via the clutch gear 4. As shown in FIG. 3, the large gear 54 of the idler 52 meshes with the intermediate gear 6 adjacent the supply reel support 7, drivingly rotating the reel support 7 counterclockwise.

When the VCR is set in the FF mode or the REW mode, the pivotal lever 81 of the raising-lowering mechanism 8 depresses the clutch gear 4 as previously stated, engaging the clutch gear 4 and the cap disk 37 with each other as shown in FIG. 4. The claws 43 of the clutch gear 4 remain meshing with the claws 31 of the PLAY disk 32.

Consequently, the pulley 21 is connected to the PLAY disk 32 and the clutch gear 4, rendering the clutch gear 4 rotatable with the driven pulley 21. Thus, the frictional power transmission mechanism 2 rotates as a unit, with no slippage occurring between the driven pulley 21 and the PLAY disk 32 and the REV disk 26. As a result, the rotation of the pulley 21 is transmitted directly to the clutch gear 4 and further to the intermediate gear 6 via the small gear 55 and the large gear 54 of the swing idler mechanism 5 to drivingly rotate the supply reel support 7 or the take-up reel support 71 at a high speed.

With the reel support drive device described, the frictional torque to be transmitted by the power transmission mechanism 2 is made different for the PLAY mode and the REV mode to give greater reel support drive torque in the REV mode than in the PLAY mode, so that the power transmission paths from the capstan motor 13 to the two reel supports 7, 71 can be made equal in reduction ratio. This makes it possible to design the two reel supports 7, 71 with the same specifications, further assuring the FF mode and the REW mode of the same tape winding speed and making the VCR appear sophisticated when operated.

Further because the power transmission mechanism 2 and the clutch gear 4 are mounted on the pivot 11 in common as a unit, the device is more compact in its entirety than the conventional device wherein the clutch rotation mechanism 194 and the frictional power transmission mechanism 190 are separated.

What is claimed is:

1. A reel support drive device for selectively drivingly rotating a supply reel support and a take-up reel support by a motor, the drive device having a frictional power transmission mechanism disposed in a power transmission path from the motor toward the two reel supports, the power transmission mechanism comprising a friction member carried by a rotatable input body and disposed between said rotatable input body and a rotatable output body which are coaxially disposed and rotatable relative to each other, the output rotary body of the power transmission mechanism comprising a first rotatable member in slidable contact with one of an outer peripheral region and an inner peripheral region of the friction member, a second rotatable member in slidable contact with the other peripheral region of the friction member, and one-way clutch means provided between the two rotatable members, the first rotatable member being operable to transmit output power to a selected reel support, wherein the one-way clutch means comprises a one-way clutch spring having an inner periphery in contact with an outer periphery of the second rotatable member and being engaged in the first rotatable member at one end thereof.

2. A reel support drive device according to claim 1 wherein the one-way clutch means connects the first rotatable member and the second rotatable member to each other in a reverse reproduction mode in which the supply reel support is drivingly rotated in a tape winding direction to play back a magnetic tape while disconnecting the two rotatable members from each other in a forward reproduction mode in which the take-up reel support is drivingly rotated in a tape winding direction to play back the magnetic tape.

3. A reel support drive device according to claim 1 which further comprises a rotatable clutch body coaxially disposed with respect to the rotatable input body and the rotatable output body of the power transmission mechanism, and the rotatable clutch body is in engagement with the first rotatable member of the rotatable output body at all times to continuously rotate therewith and is selectively engageable with the rotatable input body to rotate therewith when engaged therewith.

4. A reel support drive device according to claim 1 wherein the rotatable clutch body is coupled to a control mechanism for engaging the rotatable clutch body with the rotatable input body in a fast forward/rewind mode in which a selected one of the supply reel support and the take-up reel support is rotated at a high speed in a tape winding direction while disengaging the rotatable clutch body from the rotatable input body in a reproduction mode in which the selected one of the supply reel support and the take-up reel support is rotated in the tape winding direction to play back a magnetic tape.

* * * * *